US008445651B2

(12) United States Patent
Zhu et al.

(10) Patent No.: US 8,445,651 B2
(45) Date of Patent: May 21, 2013

(54) METHOD FOR PRODUCING CHARGE CONTROL AGENT AND TONER

(75) Inventors: Shunquan Zhu, Wuhan (CN); Yubin Wang, Wuhan (CN)

(73) Assignee: Hubei Dinglong Chemical Co., Ltd., Wuhan (CN)

( * ) Notice: Subject to any disclaimer, the term of this patent is extended or adjusted under 35 U.S.C. 154(b) by 603 days.

(21) Appl. No.: 12/394,024

(22) Filed: Feb. 26, 2009

(65) Prior Publication Data

US 2010/0105884 A1 Apr. 29, 2010

(30) Foreign Application Priority Data

Oct. 23, 2008 (CN) .......................... 2008 1 0197365

(51) Int. Cl.
*C09B 45/01* (2006.01)

(52) U.S. Cl.
USPC .......................................................... 534/602

(58) Field of Classification Search
None
See application file for complete search history.

(56) References Cited

U.S. PATENT DOCUMENTS 2,778,816 A * 1/1957 Buehler et al. ................ 534/723
3,185,676 A * 5/1965 Klein ............................ 534/602
4,180,502 A * 12/1979 Kaufmann ..................... 534/602
4,433,040 A * 2/1984 Niimura et al. .......... 430/108.23
4,624,907 A * 11/1986 Niimura et al. .......... 430/108.23
4,904,767 A * 2/1990 Beffa et al. .................... 534/696
4,997,917 A * 3/1991 Iff et al. ......................... 534/602
5,250,671 A * 10/1993 Mennicke ...................... 534/698
6,326,113 B1 * 12/2001 Okuda et al. ............. 430/108.21
6,656,653 B2 * 12/2003 Mitsuhashi et al. ..... 430/108.23
6,756,485 B2 * 6/2004 Yasumatsu et al. ........... 534/581
6,902,612 B2 * 6/2005 Bindra .......................... 106/402
7,135,266 B2 * 11/2006 Baur et al. ............... 430/137.21
8,076,465 B2 * 12/2011 Kuroda et al. ................ 534/602

FOREIGN PATENT DOCUMENTS

CN 1544529 A * 10/2004
JP 2005-345975 * 12/2005

OTHER PUBLICATIONS

Machine Translation of JP 2005-345975, Dec. 15, 2005.*
Hsieh, Bing R., "Synthesis of Aizen Spilon Black TRH and its Derivatives", Dyes and Pigments, 1494), 287-305, 1990.*
Zuo et al., "Preparation of mono-azo chromium complex dyes", Chemical Abstracts, 143:249719, 2005, Abstract of CN 1544529).*
Machine Translation of Claims of CN 1544529, Application 200310111379, Oct. 2004, pp. 1-2, claims 1 to 10.*

* cited by examiner

*Primary Examiner* — Michael Barker
(74) *Attorney, Agent, or Firm* — Matthias Scholl P.C.; Matthias Scholl

(57) ABSTRACT

The invention discloses a method for producing a charge control agent and a toner containing the charge control agent. The preparation method includes the technical proposal that in aqueous medium, an azo compound is reacted with a salicylic acid chromium complex, which is used as a complexing agent to synthesize a specific azo chromium complex. The preparation method is characterized by complex synthesis engineering. The toner of the invention includes a charge control agent obtained from the method described herein. Provided is a method for obtaining a charge control agent and a toner with excellent chargeability in that no flying or fogging is observed, even during image formation at high printing speeds. The toner is relatively free from the influences of variations in the environmental temperature and humidity, which ensures stable image printing with high picture quality for long periods of time.

20 Claims, No Drawings

METHOD FOR PRODUCING CHARGE CONTROL AGENT AND TONER

CROSS-REFERENCE TO RELATED APPLICATIONS

Pursuant to 35 U.S.C. §119 and the Paris Convention Treaty, this application claims the benefit of Chinese Patent Application No. 200810197365.2 filed Oct. 23, 2008, the contents of which are incorporated herein by reference.

BACKGROUND OF THE INVENTION

1. Field of the Invention

The invention relates to a method for producing a charge control agent and a toner containing such charge control agent.

2. Description of the Related Art

In the past, a charge control agent formed by an azo metal complex has been widely used under circumstances in which a developer toner is used for electrophotography. The charge control agent is used to form the toner (for example: Japanese patent publication No. 63-61347 bulletin, Japanese patent publication No. 2-16916 bulletin, Japanese patent publication No. 2002-53539 bulletin and patent No. 2531957 bulletin). In recent years, along with the expanded use of electrophotography, charge control agents have been used to form the toner in the field of light printing.

The printing speed in light printing is required to be fast. In the printing field in general, including in light printing, the printing process itself is not evaluated, but the printed images, that is, the prints, are evaluated. In the printing field, an image hard copy is required to have a stable picture quality for a long period of time.

To ensure that the printed image achieves stability during high-speed printing, the developer must mix and electrify the newly recharged toner within short periods of time. In high-speed printing, the recharge rate of the toner also takes place at high speed; however, if the toner is insufficiently charged, then the charge on the toner, which is used as the developer, is not uniform. An insufficiently electrified toner can cause problems associated with toner, such as the flying of the toner and formation of fog.

Long-term use of a developer results in variations in the usage environment of an image formation device, and these environmental variations can influence the chargeability of the toner used as the developer. The obtained images, especially all-black or half-tone images, can display problematic variations in toner concentration.

Charge control agent formed by azo metal complex generally adopts a method in which an azo compound provides the raw materials for synthesizing a metal complex. The complexing agent and reaction medium used for synthesizing the azo metal complex cannot completely removed from the charge control agent in this method and residual components exist. The azo metal complex is synthesized using chromic formate as the complexing agent. The reaction medium usually contains ethylene glycol monoethyl ether, ethylene glycol monomethyl ether, and other organic solvents. Chromic formate generates formic acid, which irritates the skin, and ethylene glycol monoethyl ether and ethylene glycol monomethyl ether are potentially hazardous chemical substances. Therefore, from a safety perspective, the standard method for producing a charge control agent using an azo metal complex without ethylene glycol monoethyl ether or ethylene glycol monomethyl ether is in high demand.

SUMMARY OF THE INVENTION

Based on the background, the invention includes methods for producing a charge control agent formed by an azo metal complex and further introduces a method for electrifying and controlling the chargeability of the charge control agent. This invention is directed toward manufacturing engineering, in which the residual components of the reaction medium used in the synthesis of the azo metal complex significantly influence the chargeability.

In view of the above-described problems, it is one objective of the invention to provide a method for producing a charge control agent. The reaction medium used to obtain the azo chromium complex includes residual synthetic components, and the residual components must be prevented from negatively impacting the performance of the electric regulator. The methods of the invention provide a new charge control agent.

An objective of the invention is to provide a method for producing a charge control agent with excellent chargeability control performance.

An objective of the invention is to provide a toner with excellent chargeability, which avoids the flying of the toner and the formation of fog, even during high-speed printing. The toner is not affected by environmental variations that include temperature and humidity variations, thereby ensuring that stable images are obtained to provide long-term high-quality pictures.

The method for producing a charge control agent comprises producing a charge control agent formed by an azo chromium complex such that in an aqueous medium, the azo chromium complex indicated by the general formula (1) is synthesized through the reaction of an azo compound and a salicylic acid chromium complex, which is used as a complexing agent.

General formula (1)

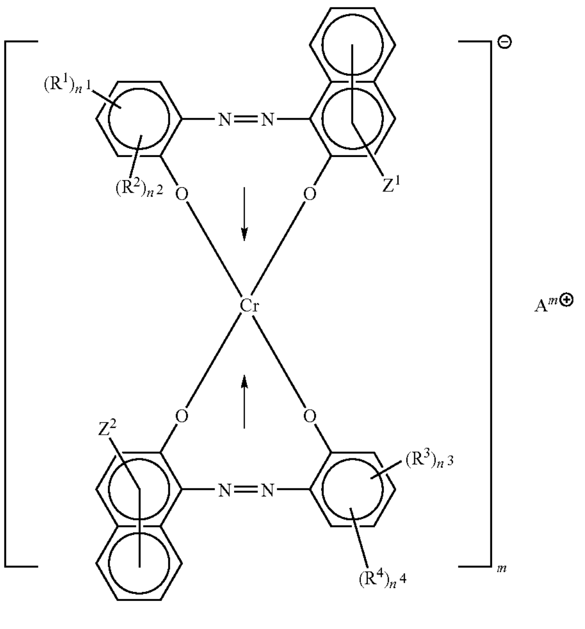

In the formula, $R^1$ to $R^4$ are respectively selected from the group consisting of hydrogen atoms, substituted or unsubstituted alkyl having 1-18 carbon atoms, alkenyl with 1-18 carbon atoms, alkoxy with 1-18 carbon atoms, sulfonic acid group, methyl sulfonyl, sulfoacid amino, alkyl amino sulfonyl with 1-18 carbon atoms, hydroxyl, carboxyl, —$COOR^5$ group (wherein, $R^5$ indicates alkyl with 1-18 carbon atoms), acetylamino, bromine atoms, chlorine atoms, iodine atoms, fluorine atoms and nitryl. $Z^1$ and $Z^2$ respectively and independently indicate hydrogen atoms, carboxyl, hydroxyl, —$COOR^6$ group (wherein, $R^6$ indicates substituted or unsubstituted phenyl, substituted or unsubstituted alkyl having 1-18 carbon atoms, substituted or unsubstituted cycloalkyl having 3-12 carbon atoms), —$CONHR^7$ (wherein, $R^7$ indicates substituted or unsubstituted phenyl, substituted or unsubstituted alkyl having 1-18 carbon atoms, substituted or unsubstituted cycloalkyl having 3-12 carbon atoms), and —$NHCOR^8$ (wherein, $R^8$ indicates substituted or unsubstituted phenyl, substituted or unsubstituted alkyl having 1-18 carbon atoms, substituted or unsubstituted cycloalkyl having 3-12 carbon atoms); additionally, $A^{m+}$ indicates cations having an oxidation state of +1 to +6; m indicates an integer between 1 and 6, $n^1$–$n^4$ indicate integers between 0 and 4 (which meet the condition that $n^1+n^2=4$ and $n^3+n^4=4$).

In an example of the method for producing a charge control agent, the salicylic acid chromium complexing agent preferably takes the form of a chromium salicylic acid alkali metal salt.

In an example of the method for producing a charge control agent and in the synthetic engineering of a complex, the reaction between the azo compound and the salicylic acid chromium complexing agent is preferably carried out in the presence of compounds selected from the group comprising long-chain alkyl ammonium salts, aryl ammonium salts, and crown ethers, or strong polar solvents, and inorganic base.

In an example of the method for producing a charge control agent, the azo compound is obtained coupling an aromatic diazo compound with a naphtholate compound, and the salicylic acid chromium complex is preferably added to the reaction solution of the coupling reaction as a complexing agent.

A toner of the invention contains a charge control agent obtained using the methods described above for producing a charge control agent.

According to the method for producing a charge control agent of the invention, the reaction system comprising the azo compound and a complexing agent for obtaining an azo chromium complex occurs in an aqueous medium. The reaction medium used for the synthesis of the azo chromium complex cannot be completely removed, and residual components remain in solution. However, the residual components of the reaction medium do not bring disadvantages. Moreover, the combination of hydrogen of the water in the aqueous medium which forms the reaction medium, permits formation of the azo chromium complex to yield a charge control agent with excellent chargeability.

In an example of the method for producing a charge control agent in which the aromatic diazo compound is coupled to the naphtholate compound, the azo compound used as the raw material for forming an azo chromium complex does not need to be recycled and removed from the reaction solution. Instead, a complexing agent is added to the reaction solution to synthesize the azo chromium complex, thereby yielding a charge control agent.

In an example of the method for producing a charge control agent, the reaction of the azo compound and the complexing agent is carried out in the presence of compounds selected from a group comprising long-chain alkyl ammonium salts, aryl ammonium salts, crown ethers, or strong polar solvents, and inorganic base. The complexation reaction can be easily carried out, and the chargeability can be stabilized. Thus, a charge control agent with excellent chargeability control performance is produced.

The toner of the invention contains a charge control agent with excellent chargeability control performance, and this toner may be used to produce images with high picture quality without sensitivity to the local printing environment. The excellent chargeability of toner provided according to the invention result in the production of high-quality images at high printing speeds without toner flying or fogging caused by uneven toner charge.

Following is a detailed description of the invention.

The method of producing a charge according to the invention produces a charge control agent comprising an azo chromium complex (which is called a 'specific azo chromium complex' in the following) indicated by the general formula (1), according to the complex synthesis engineering (which is called 'specific complex synthesis engineering' in the following) as follows: in an aqueous medium, an azo compound (which is called the 'azo compound' in the following) is reacted with a salicylic acid chromium complex, which is used as a complexing agent, so as to synthesize a specific azo chromium complex.

Here, the 'aqueous medium' principally comprises water, specifically speaking, the proportion of water is required to be more than 50% by weight, most preferably more than 80% by weight.

In the general formula (1), which indicates the specific azo chromium complex, $R^1$ to $R^4$ independently indicate hydrogen atoms, substituted or unsubstituted alkyl having 1-18 carbon atoms, alkenyl with 1-18 carbon atoms, alkoxy with 1-18 carbon atoms, sulfonic acid group, methyl sulfonyl, sulfoacid amino, alkyl amino sulfonyl with 1-18 carbon atoms, hydroxyl group, carboxyl, —$COOR^5$ group (wherein $R^5$ indicates alkyl with 1-18 carbon atoms), acetylamino, bromine atoms, chlorine atoms, iodine atoms, fluorine atoms, and nitryl, etc.

The $R^1$ to $R^4$ can be identical or not.

Group $R^1$ to group $R^4$ indicate substituted or unsubstituted alkyl having 1-18 carbon atoms, such as methyl, capryl, decyl, dodecyl, 2-ethylhexyl, t-dodecyl, etc.

Group $R^1$ to group $R^4$ indicate alkenyl with 2-18 carbon atoms, such as dodecenyl, octenyl, etc.

Group $R^1$ to group $R^4$ indicate alkoxy with 1-18 carbon atoms, such as $CH_3O$-group, $C_2H_5O$-group, $C_8H_{17}O$-group, $C_{12}H_{25}O$-group, $C_{15}H_{31}O$-group.

Group $R^1$ to group $R^4$ indicate sulfonic acid group, such as a —$SO_3H$ group.

Group $R^1$ to group $R^4$ indicate alkyl amino sulfonyl with 1-18 carbon atoms, such as $CH_3NHSO_3$-group, $(CH_3)_2NSO_3$-group, $(C_2H_5)_2NSO_3$-group, $(C_8H_{17})_2NSO_3$-group, $(C_{12}H_{25})_2NSO_3$-group, etc.

Group $R^1$ to group $R^4$ indicate —$COOR^5$, such as $CH_3COO$-group, C $2H_5COO$-group, $C_3H_7COO$-group, $C_4H_9COO$-group, $C_8H_{17}COO$-group, $C_{12}H_{25}COO$-group, $C_{15}H_{31}COO$-group, etc.

Additionally, in the general formula (1), $Z^1$ and $Z^2$ independently indicate hydrogen atoms, carboxyl, hydroxyl, —$COOR^6$ group (wherein, $R^6$ indicates substituted or unsubstituted phenyl, substituted or unsubstituted alkyl having 1-18 carbon atoms and substituted or unsubstituted cycloalkyl group having 3-12 carbon atoms), —$CONHR^7$ group (wherein, $R^7$ indicates substituted or unsubstituted phenyl, substituted or unsubstituted alkyl having 1-18 carbon atoms, and substituted or unsubstituted cycloalkyl group having 3-12 carbon atoms), and —$NHCOR^8$ group (wherein, $R^8$ indicates substituted or unsubstituted phenyl group, substituted or unsubstituted alkyl group having 1-18 carbon atoms, and substituted or unsubstituted cycloalkyl group having 3-12 carbon atoms).

$Z^1$ and $Z^2$ can be identical or not.

Group $Z^1$ and group $Z^2$ indicate a —$COOR^6$, such as $CH_3COO$-group, $C_2H_5COO$-group, $C_3H_7COO$-group, $C_4H_9COO$-group, $C_8H_{17}COO$-group, $C_{12}H_{25}COO$-group, $C_{15}H_{31}COO$-group, etc.

Group $Z^1$ and group $Z^2$ indicate a —$CONHR^7$, such as —$CONHC_6H_5$ group, —$CONH(Cl)C_6H_4$, —$CONH(CH_3O)_2C_6H_3$, —$CONH(NO_2)C_6H_4$ group, —$CONH(CH_3)(Cl)C_6H_3$, —$CONH(CH_3O)_2$ $(Cl)C_6H_2$ group, —$CONH((CH_3)_2CH)_2C_6H_3$, —$CONH(C_3H_7)C_6H_4$ group, —$CONH(C_8H_{17})C_6H_4$, —$CONH(C_{12}H_{25})C_6H_4$, —$CONH(C_{18}H_{37})C_6H_4$ group, —$CONH(C_8H_{17}O)C_3H_4)C_6H_4$, —$CONH(C_3H_5)C_6H_4$ group, —$CONH(C_{12}H_{23})C_6H_4$, etc.

Group $Z^1$ and group $Z^2$ indicate —$NHCOR^8$, such as —$NHCOCH_3$ group, —$NHCOC_8H_{17}$, etc.

Additionally, in the general formula (1), $A^{m+}$ indicates a cation having an oxidation state of +1 to +6, m indicates an integer between 1 and 6.

Here, the cations indicated by $A^{m+}$ can be inorganic cations or inorganic cations.

In the general formula (1), $A^{m+}$ indicates inorganic cations, such as H', $K^+$, $Li^+$, $Na^+$, $Ca^{2+}$, $Mg^{2+}$, $Ba^{2+}$, $SR^{2+}$, $Zn^{2+}$, $Cu^{2+}$, $CO^{2+}$, $Ti^{2+}$, $Fe^{2+}$, $Mn^{2+}$, $Ni^{2+}$, $Sn^{2+}$, $Si^{2+}$, $Al^{3+}$, $Cr^{3+}$, $Fe^{3+}$, $Co^{3+}$, $Si^{4+}$, $Te^{4+}$, $Ti^{4+}$, $Zr^{4+}$, $Ge^{4+}$, $NH^{4+}$, $W^{5+}$, $Mo^{5+}$, $W^{6+}$, $MO^{6+}$, etc. or organic cations, such as $(H_3NCH_2CH_2CH_2NH_3)^{2+}$, $(H_{17}C_8HNCH_2CH_2CH_2NH_3)^{2+}$, $(H_{33}C_{16}HCOHCH_2NH_2CH_2CH_2NH_3)^{2+}$, $(H_{29}C_{14}$ $HCOHCH_2$ $HNC_2H_5CH_2CH_2NH_2CH_2H_5)^{2+}$, $(H_3NCH_2CH_2CH_2NH_2CH_2CH_2CH_2NH_3)^{3+}$, $(H_5C_2HNC_2H_5CH_2CH_2CH_2HNC_2H_5CH_2CH_2CH_2HNC_2H_5C_2H_5)^{3+}$, $(H_3NCH_2CH_2CH_2N(CH_3)_2CH_2CH_2CH_2N(CH_3)_2CH_3)^{3+}$, $(H_3NCH_2CH_2CH_2NH_2CH_2CH_2CH_2NH_2CH_2CH_2CH_2NH_3)^{4+}$, $(H_2N(C_2H_5)CH_2CH_2CH_2N(C_2H_5)_2CH_2CH_2CH_2N(C_2H_5)_2CH_2CH_2CH_2N(C_2H_5)_2CH_2CH_2CH_2NH_3)^{5+}$, $(H_3CHNCH_3CH_2CH_2N(C_2H_5)_2CH_2CH_2N(C_2H_5)_2CH_2CH_2N(C_2H_5)_2CH_2CH_2N(C_2H_5)_2CH_2CH_2HNCH_3CH_3)^{6+}$, etc.

Additionally, in the general formula (1), $n^1$ to $n^4$ indicate an integer between 0 to 4 and are required to meet the conditions $n^1+n^2=4$ and $n^3+n^4=4$.

The specific azo chromium complex may preferably be the azo chromium complex indicated in the general formula (2).

The specific azo chromium complex indicated by the general formula (2) is a substance having $n^1$–$n^4$ equal to 1 and m equal to 1 in the general formula (1).

General formula (2)

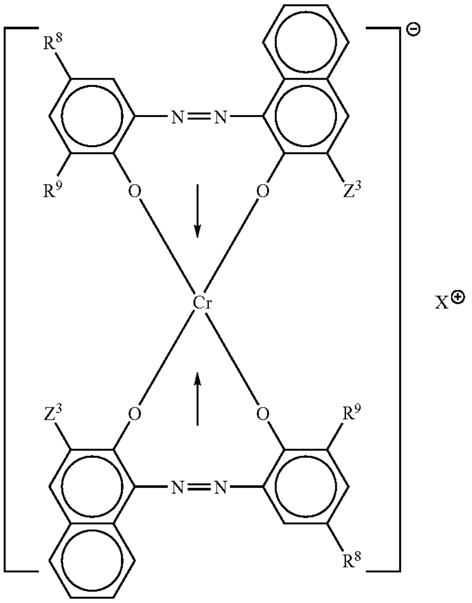

In the formula, $R^8$ and $R^9$ independently indicate hydrogen atoms, substituted or unsubstituted alkyl group having 1-18 carbon atoms, alkenyl group with 2-18 carbon atoms, alkoxy group with 1-18 carbon atoms, sulfonic acid group, methyl sulfonyl group, sulfoacid amino group, alkyl amino sulfonyl group with 1-18 carbon atoms, hydroxyl group, carboxyl group, —$COOR^5$ group (wherein $R^5$ indicates alkyl group with 1-18 carbon atoms), acetylamino group, bromine atoms, chlorine atoms, iodine atoms, fluorine atoms, and nitryl group.

$Z^3$ indicates hydrogen atoms or —$NHCOR^7$ group (wherein $R^7$ indicates substituted or unsubstituted phenyl group, substituted or unsubstituted alkyl group having 1-18 carbon atoms, or substituted or unsubstituted cycloalkyl group having 3-13 carbon atoms). Additionally, X indicates H, Na, K, Li, or $NH_4$.

The charge control agent obtained from the method according to the invention for producing the charge control agent is formed by the specific azo chromium complex indicated in the general formula (1). The charge control agent is a substance obtained from specific complex synthesis engineering and is formed by a single azo chromium complex or an azo chromium complex in which $A^{m+}$ comprises more than 2 types of different cations in the general formula (1).

When the charge control agent of the invention is formed by a mixture of the azo chromium complex with more than 2 types of different counterions, excellent frictional chargeability can be obtained. Moreover, high dispersion can be obtained from the resin used by the toner, thus improving the properties.

The reason underlying why the charge control agent formed by the mixture of the azo chromium complex with more than 2 types of different counterions yields excellent properties remains unknown. Presumably, as the azo chromium complex is mixed, the crystal ordering slows down and particulates form easily. The dispersion is thereby improved.

In the synthesis engineering of the specific complex for synthesizing the specific azo chromium complex, the azo compound and the complexing agent formed by the salicylic acid chromium complex form a complex in the aqueous medium.

Here, the reaction mixture obtained from the complex formation reaction is submitted to counterion exchange in an acidic aqueous solution or in inorganic aqueous ammonia, according to necessity. During counterion exchange, the counterions of the azo chromium complex can be entirely transformed into other substances or used for preparing the mixture of the azo chromium complex in the presence of 2 or more types of different cations. Additionally, the mixing ratio of the azo chromium complex with more than 2 types of different cations can be adjusted.

The azo compound supplied to the specific complex synthesis engineering, i.e., the complex formation reaction, can be a dried substance or a wet substance with a high water content. Generally, dried substances with a water content of less than 5% are preferable.

The azo compound supplied to the complex reaction can be selected according to the azo chromium complex required to be synthesized. For example, the aromatic compound indicated in the general formula (3) and the aromatic compound indicated in the general formula (4) may be, respectively, diazotized by normal methods. The obtained aromatic diazo compounds are, respectively, coupled with the naphtholate compound indicated in the general formula (5) or the naphtholate compound indicated in the general formula (6) by normal methods to yield the compound indicated by the general formula (7) and the compound indicated by the general formula (8), respectively.

Here, in the coupling reaction of the aromatic diazo compound and the naphtholate compound for synthesizing the azo compound, the commonly adopted reaction medium is an aqueous medium.

General formula (3)

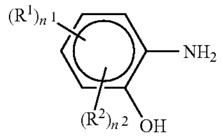

$R^1$ and $R^2$ independently indicate hydrogen atom, substituted or unsubstituted alkyl group having 1-18 carbon atoms, alkenyl group with 2-18 carbon atoms, alkoxy group with 1-18 carbon atoms, sulfonic acid group, methyl sulfonyl group, sulfoacid amino group, alkyl amino sulfonyl group with 1-18 carbon atoms, hydroxyl group, carboxyl group, —$COOR^5$ group (wherein $R^5$ indicates alkyl group with 1-18 carbon atoms), acetylamino group, bromine atoms, chlorine atoms, iodine atoms, fluorine atoms, and nitryl group. $n^1$ and $n^2$ indicate integers between 0 to 4 (required to meet the conditions of $n^1+n^2=4$).

General formula (4)

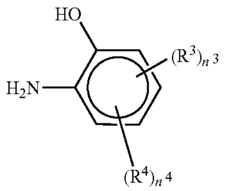

$R^3$ and $R^4$ independently indicate hydrogen atoms, substituted or unsubstituted alkyl having 1-18 carbon atoms, alkenyl with 2-18 carbon atoms, alkoxy with 1-18 carbon atoms, sulfonic acid group, methyl sulfonyl, sulfoacid amino, alkyl amino sulfonyl with 1-18 carbon atoms, hydroxyl, carboxyl, —$COOR^5$ group (wherein, $R^5$ indicates alkyl with 1-18 carbon atoms), acetylamino, bromine atoms, chlorine atoms, iodine atoms, fluorine atoms and nitryl. $n^3$ and $n^4$ indicate integers between 0 to 4 (required to meet the condition of $n^3+n^4=4$).

General formula (5)

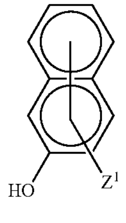

In the formula, $Z^1$ indicates hydrogen atoms, carboxyl, hydroxyl, —$COOR^6$ group (wherein, $R^6$ indicates substituted or unsubstituted phenyl, substituted or unsubstituted alkyl having 1-18 carbon atoms, substituted or unsubstituted cycloalkyl having 3-12 carbon atoms), —$CONHR^7$ (wherein, $R^7$ indicates substituted or unsubstituted phenyl, substituted or unsubstituted alkyl having 1-18 carbon atoms, substituted or unsubstituted cycloalkyl having 3-12 carbon atoms), —$NHCOR^8$ (wherein, $R^8$ indicates substituted or unsubstituted phenyl, substituted or unsubstituted alkyl having 1-18 carbon atoms, substituted or unsubstituted cycloalkyl having 3-12 carbon atoms).

General formula (6)

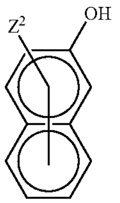

In the formula, $Z^2$ indicates hydrogen atoms, carboxyl, hydroxyl, —$COOR^6$ group (wherein, $R^6$ indicates substituted or unsubstituted phenyl, substituted or unsubstituted alkyl having 1-18 carbon atoms, substituted or unsubstituted cycloalkyl having 3-12 carbon atoms), —$CONHR^7$ group (wherein, $R^7$ indicates substituted or unsubstituted phenyl, substituted or unsubstituted alkyl having 1-18 carbon atoms, substituted or unsubstituted cycloalkyl having 3-12 carbon atoms), —$NHCOR^8$ group (wherein, $R^8$ indicates substituted or unsubstituted phenyl, substituted or unsubstituted alkyl having 1-18 carbon atoms, substituted or unsubstituted cycloalkyl having 3-12 carbon atoms).

General formula (7)

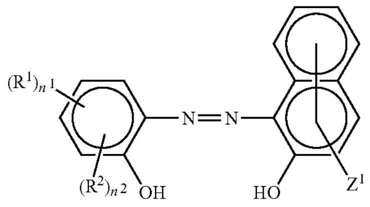

In the formula, $R^1$ and $R^2$ independently indicate hydrogen atom, substituted or unsubstituted alkyl group having 1-18 carbon atoms, alkenyl group with 2-18 carbon atoms, alkoxy group with 1-18 carbon atoms, sulfonic acid group, methyl sulfonyl group, sulfoacid amino group, alkyl amino sulfonyl group with 1-18 carbon atoms, hydroxyl group, carboxyl group, —$COOR^5$ group (wherein $R^5$ indicates alkyl group with 1-18 carbon atoms), acetylamino group, bromine atoms, chlorine atoms, iodine atoms, fluorine atoms, and nitryl group. $Z^1$ indicates hydrogen atom, carboxyl group, hydroxyl group, —$COOR^6$ group (wherein $R^6$ indicates substituted or unsubstituted phenyl group, substituted or unsubstituted alkyl group having 1-18 carbon atoms, substituted or unsubstituted cycloalkyl having 3-12 carbon atoms), —$CONHR^7$ group (wherein $R^7$ indicates substituted or unsubstituted phenyl, substituted or unsubstituted alkyl group having 1-18 carbon atoms, substituted or unsubstituted cycloalkyl group having 3-12 carbon atoms), and —$NHCOR^8$ group (wherein $R^8$ indicates substituted or unsubstituted phenyl group, substituted or unsubstituted alkyl group having 1-18 carbon atoms, substituted or unsubstituted cycloalkyl group having 3-12 carbon atoms). $n^1$ and $n^2$ indicate integers between 0 and 4 (required to meet the conditions of $n^1+n^2=4$).

General formula (8)

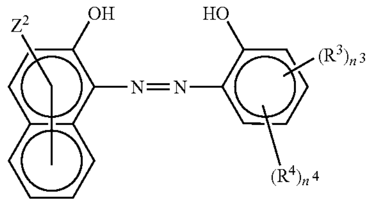

In the formula, $R^3$ and $R^4$ independently indicate hydrogen atoms, substituted or unsubstituted alkyl having 1-18 carbon atoms, alkenyl with 2-18 carbon atoms, alkoxy with 1-18 carbon atoms, sulfonic acid group, methyl sulfonyl, sulfoacid amino, alkyl amino sulfonyl with 1-18 carbon atoms, hydroxyl, carboxyl, —$COOR^5$ group (wherein, $R^5$ indicates alkyl with 1-18 carbon atoms), acetylamino, bromine atoms, chlorine atoms, iodine atoms, fluorine atoms and nitryl. $Z^2$ indicates hydrogen atoms, carboxyl, hydroxyl, —$COOR^6$ group (wherein, $R^6$ indicates substituted or unsubstituted phenyl, substituted or unsubstituted alkyl having 1-18 carbon atoms, substituted or unsubstituted cycloalkyl having 3-12 carbon atoms), —$CONHR^7$ (wherein, $R^7$ indicates substituted or unsubstituted phenyl, substituted or unsubstituted alkyl having 1-18 carbon atoms, substituted or unsubstituted cycloalkyl having 3-12 carbon atoms), and —$NHCOR^8$ (wherein, $R^8$ indicates substituted or unsubstituted phenyl, substituted or unsubstituted alkyl having 1-18 carbon atoms, substituted or unsubstituted cycloalkyl having 3-12 carbon atoms); $n^3$ and $n^4$ indicate integers between 0 and 4 (required to meet the condition of $n^3+n^4=4$).

Here, the specific examples of the compound indicated by the general formula (3) and the compound indicated by the general formula (4) are: 4-chloro-2-aminophenol, 3,5-dichloro-2-aminophenol, 3,4,6-trichloro-2-aminophenol, 6-chloro-4-nitryl-2-aminophenol, 4,6-dinitro-2-aminophenol, 6-bromine-4-nitryl-2-aminophenol, 4-nitrophenol, 5-nitryl-2-aminophenol, 4-fluoride-2-aminophenol, 4-sulfonatyl-5-nitryl-2-aminophenol, 4-sulfamide-2-aminophenol, 4-methyl-2-aminophenol, 4,5-dimethyl-2-aminophenol, 5-methyl-4-nitryl-2-aminophenol, 4-octyl-2-aminophenol, 4-acetaldehyde amino-2-aminophenol, 2-aminophenol, 2-aminothiophenol, aminobenzoic acid, 4-chloro-2-aminobenzoic acid, 5-chloro-2-aminobenzoic acid, etc.

Here, the specific examples of the compound indicated by the general formula (5) and the compound indicated by the general formula (6) are: 2-naphthol, 2-hydroxyl-3-naphthoic acid, 2-naphthoic acid, 2-hydroxyl-3-methyl ester, 2-hydroxyl-3-(n)-butyl ester, 2-hydroxyl-3-octyl ester, 2-hydroxyl-3-octadecyl ester, 2-amino phenol, 2-monomethyl amidonaphthol, 2-thionaphthol, 3-hydroxyl-2-naphthanilide, 3-hydroxyl-4'-chloro-2-naphthanilide, 3-hydroxyl-2', 5'-dimethoxy-2-naphthanilide, 3-hydroxyl-3'-nitryl-2-naphthanilide, 3-hydroxyl-2'-methyl-4'-chloro-2-naphthanilide, 3-hydroxyl-2', 4'-dimethoxy-5'-chloro-2-naphthanilide, 3-hydroxyl-2-N-2',6'-diisopropyl phenyl carbamyl-naphthalene, 3-hydroxyl-N-4'-octyl phenyl-naphthalene, 3-hydroxyl-2-N-propyl carbamyl-naphthalene, 3-hydroxyl-2-N-octyl carbamyl-naphthalene, 3-hydroxyl-2-N-dodecyl carbamyl-naphthalene, 3-hydroxyl-2-N-octadecyl carbamyl-naphthalene, 3-hydroxyl-2-N-octyloxy propyl carbamyl-naphthalene, 3-hydroxyl-2-N-cyclopropyl carbamyl-naphthalene, 3-hydroxyl-2-N-cyclohexyl carbamyl-naphthalene, 3-hydroxyl-2-N-cyclododecyl carbamyl-naphthalene, 2-hydroxyl-3-decoylamide-naphthalene, etc.

The complexing agent supplied to the complex formation reaction can adopt the salicylic acid chromium complex.

The salicylic acid chromium complex can be a chromium salicylic acid metal salt. The metal forming the chromium salicylic acid metal salt can be an alkali metal salt composed of lithium salt, sodium salt, sylvite, or alkaline earth metalloid salts composed of calcium salt and magnesium salt. In terms of reactivity, the alkali metal salt is preferable.

Additionally, the salicylic acid of the salicylic acid chromium complex can have.

Here, the chromium salicylic acid alkali metal salt used as the complexing agent improves the reactivity because the chromium salicylic acid alkali metal salt has excellent reactivity in aqueous media, thus easily carrying out complex exchange in an aqueous medium.

The amount of the complexing agent supplied to the complex conformation reaction preferably exceeds an excess quantity of the theoretical amount required for the complex reaction to go to completion, for example, with 1 mol of azo compound, 1.0-1.6 mol complexing agent is preferable, and more preferably 1.05-1.30 mol.

Additionally, in the complex formation reaction, the reaction medium is required to be an aqueous medium.

Components of the reaction may include, in addition to water, a strong polar solvent.

The aqueous medium used for synthesizing the azo compound by coupling the aromatic diazo compound and the naphthol compound contains water, and the liquid component in the reaction solution obtained from the coupling reaction, which is also the material azo compound of the target reaction resultant obtained from the reaction solution of the coupling reaction, can be used as solidification component to be dispersed in dispersion liquid for proper use.

Additionally, the complex formation reaction is preferably carried out in the presence of compounds selected from the group comprising long-chain alkyl ammonium salts, aryl ammonium salts, and crown ethers, or strong polar solvents, and inorganic base.

As mentioned above, the complex formation reaction between the azo compound and the complexing agent is carried out in the presence of specific additional compounds and an inorganic base or a strong polar solvent and an inorganic base. In the complex formation reaction system, the combination of the specific additional compound or the strong polar solvent with the inorganic base can play the role of a reaction accelerator.

Additionally, the inorganic base selectively mixes with different compounds to provide the products of the complex formation reaction, thus obtaining an azo chromium complex mixture with more than 2 types of different counterions.

The specific additional compound is a substance soluble in water or organic solvents. The specific additional compounds comprise long-chain alkyl ammonium salts composed of tetrabutyl ammonium salt, trioctylphosphine methyl ammonium salt, benzyl dimethyl octadecyl ammonium salt, aryl ammonium salts composed of alkylphenyl ammonium salt, or a crown ether composed of 18-crown-6.

The specific additional compound can be a long-chain alkyl or aryl ammonium salt.

Specific examples of the specific additional compounds are: (2-methoxyl ethoxy methyl)triethyl ammonium chloride, (3-acrylamide propyl)trimethyl ammonium chloride, (3-chloro-2-hydroxypropyl)trimethylammonium, acetylcholine chloride, benzoyl choline chloride, benzyl hexadecyl dimethyl ammonium chloride hydrate, benzyl dimethyl phenyl ammonium chloride, benzyl dimethyl stearoyl ammonium chloride hydrate, benzyltributyl ammonium chloride, benzyl triethyl ammonium chloride, benzoyl trimethyl ammonium chloride, choline chloride, dimethyl distearoyl ammonium chloride, DL-carnitine hydrochloride, dodecyl trimethyl ammonium chloride, hexadecatyl trimethyl ammonium chloride, hexa methonium chloride, methyl tri-n-octyl ammonium chloride, methyl triethyl ammonium chloride, n-decatyl trimethyl ammonium chloride, n-octyl trimethyl ammonium chloride, tetrabutyl ammonium chloride, trimethyl phenyl ammonium chloride, trimethyl stearoyl ammonium chloride, benzyl trimethyl ammonium bromide, decatyl trimethyl ammonium bromide, didecatyl dimethyl ammonium bromide, dilauryl dimethyl ammonium bromide, hexadecatyl trimethyl ammonium bromide, n-octyl trimethyl ammonium bromide, phenyl trimethyl ammonium bromide, tetra-n-decatyl ammonium bromide, trimethyl stearoyl ammonium bromide, benzyl trimethyl ammonium hydroxide, etc.

Additionally, the amount of the specific additional compound is preferably 1-30% by weight based on the amount of the salicylic acid chromium complex used as the complexing agent, and 5-20% by weight is preferable.

Examples of strong polar solvents are: N,N-dimethylformamide (DMF), N,N-dimethyl propanamide (DMA), N-methyl-2-pyrrolidinone, dimethylimidazolidine, dimethyl sulfoxide (DMSO), tetrahydrofuran (THF), γ-butyrolactone, diacetone alcohol, etc.

Aprotic solvents composed of the N,N-dimethylformamide (DMF), N,N-dimethyl propanamide (DMA), dimethyl sulfoxide (DMSO) are preferable.

The amount of strong polar solvent preferably is 0.5-30% by weight based on the amount of the salicylic acid chromium complex used as the complexing agent, and 1-10% by weight is preferable.

The inorganic base can be any strong inorganic or weak inorganic base.

The strong inorganic bases comprise sodium hydroxide, potassium hydroxide, calvital, caustic baryta, etc. The weak inorganic bases comprise sodium carbonate, sodium bicarbonate, ammonia, magnesium hydrate, cupric hydroxide, ferric hydroxide, etc.

When the inorganic base is a strong inorganic base, the amount is 0.5-30% by weight based on the amount of salicylic acid chromium complex used as the complexing agent, and 1-10% by weight is preferable.)

On the other hand, when the inorganic base is a weak inorganic base, the amount is 1-30% by weight based on the amount of the salicylic acid chromium complex used as the complexing agent, and 2-15% by weight is preferable.

The conditions of the complex formation reaction using a specific additional compound or a strong polar solvent and an inorganic base are a reaction temperature of 100-160° C. and a reaction time of 2 to 15 hours.

In the complex formation reaction according to the above methods for producing a charge control agent, as the complexing agent adopts the salicylic acid chromium complex, the obtained product contains the azo chromium complex in addition to an excess of complexing agent. As a high fraction of the salicylic chromium complex can negatively influence the chargeability control performance, the proportion of salicylic acid chromium complex must be reduced. For example, water and other washes may be performed repeatedly.

According to the charge control agent of the invention, the chargeability control performance of the azo chromium complex can be fully developed for a salicylic acid chromium complex present at 150-300 ppm (quality proportion).

Washing during refining can employ a 'centrifugal separation method', in which solids are separated and recycled from the reaction solution of the complex reaction using a centrifugal separation device, and solids are further dispersed in the water. After washing with the water and fully dispersing and dissolving the impurities, the solids are further separated and recycled by the centrifugal separation device. The wash step is repeated. Another method, 'filter pressing', is also available, in which the solids in the reaction solution of the complex reaction are separated and recycled using a filter pressing device and are further dispersed in water. After mixing with the water and fully dispersing and dissolving the impurities, the solids are further separated and recycled by the filter pressing device. The wash step is repeated.

The centrifugal separation method or filter pressing method may be used to wash. Using tap water or well water in the washing steps introduces various ions, the ions can produce formic chromium, and the chromium salicylic acid metal salt can have a low solubility in water. As a result, specific metal salts are difficult to remove effectively, and larger amounts of wash water are necessary. Therefore, when water is used to wash, ion exchange water is preferable.

Any method for producing ion exchange water may be used. A combination of ion exchange resin, high-accuracy filters, and active carbon is generally adopted, and the ion exchange water can be obtained from tap water treatment. The electrical conductivity of the ion exchange water is preferably lower than 5 μS/cm, most preferably lower than 1 μS/cm.

Methods for measuring the electrical conductivity are not limited, for example, a conducting meter can be used.

During the washing treatment, the electrical conductivity of the residual washing liquid obtained from the ultimate washing operation is preferably lower than 1000 μS/cm.

The electrical conductivity of the wash water can used to judge the degree of removal of conductive impurities containing specific metal salts. When the electrical conductivity is lower than 1000 μS/cm, the amount of the impurities contained in the charge control agent is reduced to the desired proportion, therefore, the proportion of specific metal salts in the charge control agent can be in the expected range.

When the electrical conductivity of the residual ablution is too high, the charge control agent obtained contains conductive impurities, and the specific metal salt content is too high. Toner containing such a charge control agent may produce a favorable chargeability, but leakage of the electrification products occurs easily and a low absolute charge can occur.

According to the method for producing a charge control agent according to the invention, the reaction medium containing the azo compound and the complexing agent formed by the salicylic acid chromium complex for obtaining a specific azo chromium complex can be an aqueous medium. Therefore, even residual components of the reaction medium cannot be completely removed. However, disadvantages associated with the presence of residual components in the reaction medium can be avoided.

In well-known preparation methods, the reaction medium containing the complex formation reaction of the azo compound and the complexing agent includes solvents, such as ethylene glycol monoethyl ether, ethylene glycol monomethyl ether, etc. Ethylene glycol monoethyl ether and ethylene glycol monomethyl ether are hazardous chemicals substances, and the safety of the charge control agent is limited. The disadvantages of insufficient chargeability can occur. In the method according to the invention, such disadvantages will not occur.

Here, the reaction medium adopts ether solvents, such as ethylene glycol monoethyl ether, ethylene glycol monomethyl ether, etc. The residual components of the ether solvents cause insufficient chargeability in the charge control agent because the ether solvent is configured around the chromium, which forms the central metal of the azo chromium complex, thus negatively influencing the chargeability at the central metal.

Additionally, in the obtained charge control agent, the water that is the principal component of the aqueous medium is present as a residual component of the reaction medium, and hydrogen in the water can generate charge generation energy. Thus, the properties of the azo chromium complex yield a charge control agent with excellent chargeability control performance.

In the method for producing charge control agent, the reaction medium is an aqueous medium. The complexing agent is the salicylic acid chromium complex. The salicylic acid chromium complex is different from the formic chromium used as a complexing agent in other methods in that the salicylic acid chromium complex does not generate formic acid or other substances that are harmful to the skin or human body. Environmental pollution and health problems are also not generated.

In the method for producing a charge control agent, the azo compound used is the azo chromium complex. The coupling reaction between the aromatic diazo compound and the naphthol compound takes place in an aqueous medium, and the supernatant contains a dispersion of the azo compound of the target product. Therefore, the azo compound target product need not be recycled from the reaction solution. Addition of a complexing agent to the reaction solution produces the reaction system for synthesizing the azo chromium complex, and the charge control agent can be easily obtained.

In the method for producing a charge control agent, the reaction of the azo compound and the complexing agent is carried out in the presence of a specific additional compound or a strong polar solvent and an inorganic base. During the complex formation reaction, the use of an inorganic base to supply cations, for example, by using a mixture of different compounds, yields a mixture of the azo chromium complexes with more than 2 types of counterions. Formation of the mixture can stabilize the chargeability, easily producing a charge control agent with an excellent chargeability control performance.

The charge control agent obtained from the method for producing a charge control agent according to the invention can be used to form a a toner, which is used as the developer in electrophotography.

The toner of the invention contains a requisite charge control agent formed by the azo chromium complex. The components of the toner contain the requisite electric regulator, resins, colorants, additives comprising a releasing agent, and an external additive used as a fixation improver according to requirements. Monochromic toners and color toners can also be used.

The components of the toner according to the invention are not limited to the charge control agent. Well-known substances used in the past can be properly used here as well.

The resin can be any kind of styrene acrylic resin, polyester resin, epoxide resin, or other plastic resin, and the resins can be singly used or combined.

The colorant can be any kind of carbon black, magnetite, pigment, or dye. The proportion of colorant (100 parts by weight) relative to the amount of the resin is preferably 0.5-10 parts by weight.

The releasing agent can be any kind of substance with a low critical surface tension and a low melting point. In particular, the releasing agent can be a hydrocarbon, such as low molecular weight polypropylene, low molecular weight polyethylene, Fischer-Tropsch wax, microcrystalline wax, paraffin wax, or natural waxes, such as long-chain carboxylic ethers of docosanoic acid stearyl alcohol ester, long-chain carboxylic ethers of pentaerythritol docosanoic acid ether, or carnauba wax. The proportion of releasing agent (100 parts by weight) relative to the amount of resin is preferably 1-3% by weight.

The proportion of the charge control agent in the toner according to the invention (100 parts by weight) relative to the amount of the resin is preferably 0.1-10 parts by weight.

In the event that the proportion of the charge control agent is too low, the toner cannot yield sufficient chargeability. In the event that the proportion of the charge control agent is too large, the electric conductivity of the charge control agent can produce charge leakage, and the toner cannot yield sufficient electrification. Components of the image formation device, such as the developing sleeve, can become polluted, particularly when the toner is used as the formation material in the two-component developer. The pollution of a carrier causes insufficient chargeability in the toner.

The method for producing a toner is not limited. The method includes the use of existing methods, such as smelt-blending, the pulverizing method, and the polymerization method.

The toner according to the invention can be used as a magnetic or nonmagnetic single-component developer or as a two-component developer by blending with a carrier.

When the toner is used as a magnetic single-component developer, the black colorant can be magnetite, more ideally, magnetite with an average particle size of 80-200 nm. The magnetite has various shapes, such as cubic crystal, spherical, and octahedral shapes. If the toner is expected to turn red, spherical particle shapes are preferred. The addition of a colorant to form a magnetic single-component developer depends on the developing method. Non-contact imaging methods preferably use 35-45% by weight colorant, based on the total amount of toner. Low additions can result in flying of the toner. Large additions can result in excellent developing performance, although such results are difficult to obtain.

The use of a two-component developer toner preferably uses a carbon black colorant, and the addition amount is preferably 5-10% by weight based on the amount of the toner. To control the chromatism, the toner can be combined with color pigments.

When the toner is used as a two-component developer, the carrier used to form the two-component developer can be selected from metals, such as iron, ferrate, magnetite, and metal materials, such as an alloy, aluminum, or lead. However, ferrate is preferred. More preferably, light metal ferrate, excluding copper, zinc, etc., is preferred along with alkali metals or alkali soil metals. The carrier preferably contains the core metal materials, and resins, such as silicone, styrene acrylic resin, acrylic acid resin, or fluorine-containing resin, are used to coat the surface. The grain diameter of the carrier is preferably between 30 and 100 μm.

Some advantages of the invention are as follows: the toner of the invention contains a charge control agent with excellent chargeability control performance. Even in environments with low temperatures or low humidity, the images produced are stable and have a high picture quality. High-speed printing using the toner as a single-component developer or a two-component developer produces stable images and excellent chargeability are obtained. Toner flying or fogging due to uneven charge on the toner does not occur, thereby yielding high-quality images.

DETAILED DESCRIPTION OF THE EMBODIMENTS

The following are some embodiments of the invention, but should not be construed as limiting the invention.

Example 1 for Producing a Charge Control Agent

At room temperature, 60 mL of water, 17 g of 37% hydrochloric acid, and 15 g of 2-amino-4-irgasan are added to a three-neck flask with the volume of 250 mL and stirred for 0.5 hour to dissolve the 2-amino-4-irgasan in the hydrochloric acid. After the temperature of the aqueous solution is lowered to 5° C., 11 g of 35% $NaNO_2$ in an aqueous solution is added, the temperature is set below 5° C. and maintained between 0-5° C., the solution reacts for 2 hours, and the diazo salt solution is obtained.

A 50 mL volume of water, 18 g of 25% NaNO aqueous solution, and 8 g of 2-naphthol are added to a three-neck flask with a volume of 500 mL and stirred for 0.5 hours to obtain the naphthol solution, in which the 2-naphthol is dissolved in the sodium hydroxide aqueous solution.

After the temperature of the obtained naphthol solution is lowered to 20° C., the diazo salt solution is added to the solution, and the temperature is controlled below 25° C. The temperature of the system is maintained in the range of 20±5° C. Five hours later, the diazo salt of the 4-chloro-aminophenol is reacted with 2-naphthol, and a suspension containing the azo compound is obtained from the reaction solution (called ‘azo compound suspension (1)’ in the following).

The obtained azo compound suspension (1) is instilled with 95.5 g 10% salicylic acid chromium sodium aqueous solution, which is used as the complexing agent. One gram of the specific additional compound benzyl triethyl ammonium chloride and 1 g of a weak inorganic base sodium carbonate are added. The system temperature is then raised to 100° C., and the complex formation reaction is carried out for 10 hours at 100° C. The system temperature is then reduced to 60° C. The obtained reaction solution is filtered, the product is recycled and washed with water to obtain a wet filter cake, and 17.5 g of the charge control agent (called ‘charge control agent (1)’ in the following) formed by the azo chromium complex as indicated in the chemical formula (A) can be obtained by drying at a temperature of 80° C.

Chemical formula (A)

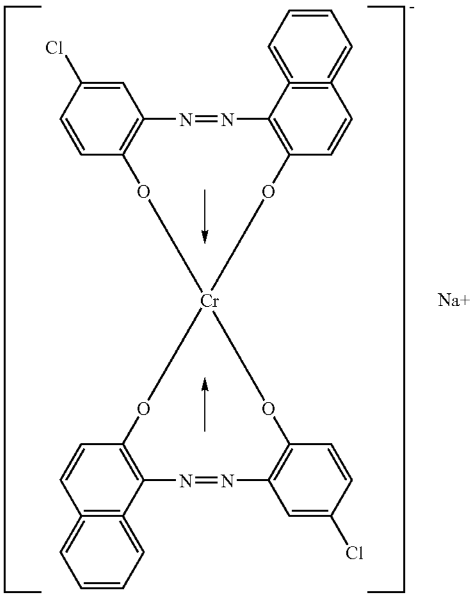

Example 2 for Producing Charge Control Agent

Based on the embodiment 1, the obtained wet filter cake is added to the acidic aqueous solution formed by 125 g of water and 37% hydrochloric acid. The solution is submitted to ion exchange treatment at a temperature of 55° C. for 1 hour, filtered, washed, and dried at a temperature of 80° C., thus deriving 17.0 g charge control agent (which is called ‘charge control agent (2)’). The charge control agent is formed from a mixture of 30% by weight azo chromium complex, as indicated in the chemical formula (A) and 70% by weight of azo chromium complex, as indicated in the chemical formula (B).

Chemical formula (B)

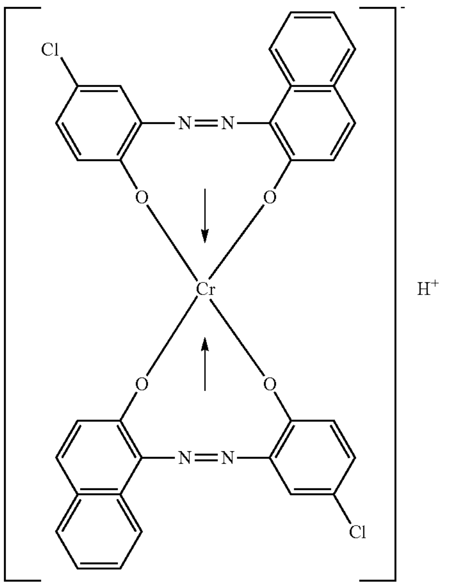

Example 3 for Producing a Charge Control Agent

At room temperature, 60 mL of water, 17 g of 37% hydrochloric acid and 11.6 g of 4,6-dinitryl-2-aminophenol are added to a three-neck flask with a volume of 250 mL, followed by stirring for 0.5 hour. After the temperature of the aqueous solution is lowered to 5° C., the solution is cooled and the system temperature is maintained below 15° C. Eleven grams of a 35% $NaNO_2$ aqueous solution is added. After 4 hours incubation at 10° C., the diazo salt suspension is obtained.

Fifty milliliters water, 18 g of a 25% NaNO aqueous solution, and 14.5 g of 3-hydroxyl-2-naphthamide are added to a three-neck flask with a volume of 500 mL, followed by stirring for 0.5 hour to obtain a naphthamide solution from 3-hydroxyl-2-naphthamide dissolved in a sodium hydroxide aqueous solution.

After the temperature of the obtained naphthamide solution is lowered to 20° C., the diazo salt suspension is added to the solution. The temperature is then maintained in the range 25±5° C. for 5 hours, the diazo salt of the 4,6-dinitryl-2-aminophenol is reacted with the 3-hydroxyl-2-naphthamide, and the suspension containing the azo compound is obtained from the reaction solution (the 'azo compound suspension (2)' in the following).

To the obtained azo compound suspension (2) is added 95.5 g of 10% salicylic acid chromium sodium aqueous solution, which is used as the complexing agent. Five milliliters of strong polar solvent N,N-dimethylformamide and 1 g weak inorganic base sodium carbonate are added. After the system temperature is raised to 100° C., the complex formation reaction is carried out for 12 hours at 100° C., and the system temperature is lowered to 60° C. The obtained reaction solution is filtered, the product is recycled and washed with water to obtain a wet filter cake, and 26.0 g of the charge control agent ('charge control agent (3)' in the following) is formed by the azo chromium complex, as indicated in the chemical formula (C). The product is obtained by drying at a temperature of 80° C.

Chemical formula (C)

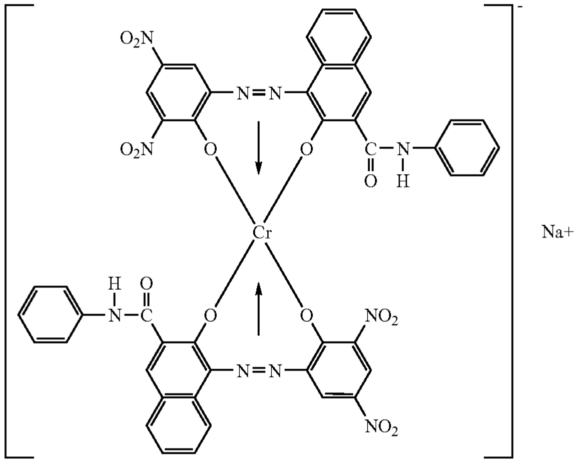

Example 4 for Producing Charge Control Agent

Based on the embodiment 3, the obtained wet filter cake is added to inorganic aqueous ammonia containing 125 g of water, 26 g of ethanol, and 19.5 g of ammonium chloride. After ion exchange treatment at 80° C., the solution is filtered, washed with water, and dried at 90° C. Then, 25.5 g of charge control agent (which is called 'charge control agent' in the following) formed by the azo chromium complex as indicated in the chemical formula (D) is obtained.

Chemical formula (D)

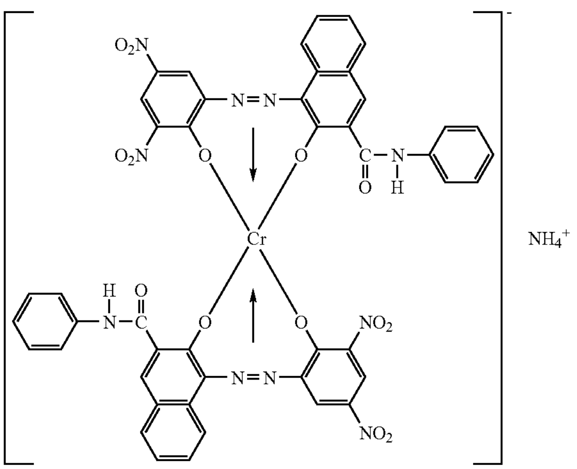

Example 1 of the Comparative Charge Control Agent

Fifteen grams of 4-chloro-2-aminophenol are added to 180 g of an aqueous solution containing 35 g hydrochloric acid. After lowering the temperature to 5° C., 22 g of sodium nitrite solution of concentration 35% are added into the solution, and the reaction proceeds for 1 hour at 5° C. to obtain the reaction solution. The reaction solution is added to a base solution containing 15.1 g of 2-naphthol, 190 g of water, and 8.5 g of sodium hydroxide (solid). At 3° C., the product can be obtained through a coupling reaction. The obtained product is separated, refined, washed, and dried to obtain 30.4 g of azo compound (azo compound (a) in the following). The obtained azo compound (a) is used as a solvent to add 74 g of ethylene glycol monoethyl ether. Eleven grams formic acid chromium are added into the solvent in which the azo compound (a) is added. After the complex formation reaction is carried out at 130° C., the solution is separated and the product is recycled by dispersion in 5 N hydrochloric acid. The product is then filter pressed to separate the solids. Subsequently, the solids are washed with water and dried at 60° C., yielding 17 g of the comparative charge control agent (which is called the 'comparative charge control agent (1)' in the following). The comparative charge control agent is the azo chromium complex indicated in the chemical formula (A).

Example 2 of the Comparative Charge Control Agent

The preparation process in this example is the same as in comparative example 1, the only difference being that the 11 g of formic acid chromium is replaced by 17.5 g of chromium sodium salicylate, and the reaction temperature of the complex formation reaction is 125° C. The comparative charge control agent (called the 'comparative charge control agent (2)' in the following) formed by the azo chromium complex is indicated in the chemical formula (A).

Example 3 of the Comparative Charge Control Agent

The preparation process in this example is the same as in comparative example 1, the only difference being that the 11 g of formic chromium used as the complexing agent is replaced by 19 g of lactic chromium, and the ethylene glycol monoethyl ether used as the reaction medium is replaced by ethylene glycol monomethyl ether. The charge control agent (called the 'comparative charge control agent (3)' in the following) is indicated in the chemical formula (A).

The charge control agents described in the embodiments 1-4 and the comparative embodiments 1-3 were used to produce the toner according to the following methods, and the toner was used to produce a two-component developer.

First, 1 part by weight of the charge control agent, 100 parts by weight of the styrene acrylic resin (styrene: butyl acrylate: methyl methacrylate=70:20:5 (mass portion), softening point is 128° C.), 8 parts by weight carbon black 'MOGUL L' (made by the Cabot company) and 6 parts by weight low molecular weight polypropylene '660P' (made by Sanyo Formation Industry) are mixed in a Henschel mixer. The obtained mixture is melted, blended and cooled by a two-axis extruder, pulverized by a fluid jet mill, and classified by a spin-flow classifier, thus obtaining the coloring particles with a median diameter of 8.5 μm.

Subsequently, 100 parts by weight of the obtained coloring particles were added to 0.8 parts by weight hydrophobic silica, with an average particle size of 12 nm and a 67th hydrophobization degree, followed by mixing in a Henschel mixer to obtain the toner.

In the following, the toners made from the charge control agents (1)-(4) are, respectively, called toners (1)-(4). Additionally, the toners made from the comparative charge control agents (1)-(3) are, respectively, called comparative toners (1)-(3).

The obtained toners are mixed with the carrier formed by the light metal ferrite covered with silicone with an average grain diameter of 65 μm to obtain the two-component developer with 8% toner.

In the following, the two-component developers made from toners (1)-(4) are, respectively, called developers (1)-(4). The two-component developers made from comparative toners (1)-(3) are, respectively, called comparative developers (1)-(3).

Thus, the developers (1)-(4) and the comparative developers (1)-(3) are obtained. The following methods are used to evaluate the chargebility and the picture quality of the images. The results are shown in the chart 1.

(1) Chargeability

One gram of toner, which forms the developers (1)-(4) and the comparative developers (1)-(3) and 10 g of carrier are respectively weighed and added to a glass tube 20 mL in volume. A low-temperature environment was tested (10° C. and a humidity of 10% RH), a YAYOI vibration machine is used for stirring for 1 minute, 2 minutes, 5 minutes, 10 minutes, 20 minutes, or 60 minutes, and a charge measuring device 'TB-200' (manufactured by Toshiba Company) is used to measure the charge in both normal-temperature and normal-humidity environments.

(2) The Picture Quality of the Image

The developers (1)-(4) and the comparative developers (1)-(4) are used in a contact imaging method, a duplicator that can form an image at a speed of 120 pieces per minutes is used for printing the image on A4 paper with a coverage rate of 5% in a low-temperature and normal-humidity environment (10° C. and a humidity of 50% RH). After 50 pieces of A4 sized copying paper are used to form images in succession, an image formation mode with a 1 minute pause for the image formation action is used to form images on five-hundred thousand pieces of copying paper. The concentration of the all-black images and concentration of the fog of the white background in the initial-stage image formed after the primary image formation action (indicated as the 'initial stage' in the chart 2) and the image formed on the five-hundred thousandth piece (indicated by '500,000th piece' in the chart 2) are measured using an 'RD-918' from the Macbeth Company. When measuring, the reflection concentration of the copying paper is 0, and the opposite reflection concentration is measured.

The resolution of the characters in the primary image and the five-hundred thousandth image is visually measured, and the charge of the toners are measured after the primary image and the 500,0000th image are formed.

CHART 1

| | Serial numbers of the toner | Electric charge regulator (CCA) | Charge (-μC/g) 1 minute | 2 minute | 5 minute | 10 minute | 20 minute | 60 minute |
|---|---|---|---|---|---|---|---|---|
| Developer 1 | 1 | 1 | 21.1 | 21.2 | 21.2 | 21.2 | 21.2 | 21.2 |
| Developer 2 | 2 | 2 | 21.3 | 21.4 | 21.4 | 21.4 | 21.4 | 21.4 |
| Developer 3 | 3 | 3 | 21.5 | 21.7 | 21.7 | 21.7 | 21.7 | 21.7 |
| Developer 4 | 4 | 4 | 21.8 | 21.9 | 21.9 | 21.9 | 21.9 | 21.9 |
| Comparative developer 1 | Comparative toner 1 | Comparative CCA 1 | 15.3 | 16.8 | 21.0 | 21.4 | 21.7 | 21.9 |
| Comparative developer 2 | Comparative toner 2 | Comparative CCA 2 | 15.2 | 16.7 | 20.8 | 21.6 | 21.9 | 22.1 |
| Comparative developer 3 | Comparative toner 3 | Comparative CCA 3 | 15.3 | 16.4 | 20.8 | 21.6 | 22.1 | 22.2 |

CHART 2

| | Serial numbers of the toner | Charge control agent (CCA) | Evaluation: Image density (%) Initial stage | Image density (%) The 500,000th piece | Fog density (%) Initial stage | Fog density (%) The 500,000th piece | Resolution (/mm) Initial stage | Resolution (/mm) The 500,000th piece | Charge (-μC/g) Initial stage | Charge (-μC/g) The 500,000th piece |
|---|---|---|---|---|---|---|---|---|---|---|
| Developer 1 | 1 | 1 | 1.42 | 1.42 | 0.000 | 0.000 | 6 | 6 | 22.4 | 20.9 |
| Developer 2 | 2 | 2 | 1.43 | 1.42 | 0.000 | 0.001 | 6 | 6 | 22.3 | 21.0 |
| Developer 3 | 3 | 3 | 1.43 | 1.43 | 0.000 | 0.001 | 6 | 6 | 22.1 | 21.3 |
| Developer 4 | 4 | 4 | 1.43 | 1.44 | 0.000 | 0.000 | 6 | 6 | 22.2 | 21.7 |
| Comparative Developer 1 | Comparative toner 1 | Comparative CCA 1 | 1.29 | 1.33 | 0.004 | 0.010 | 5 | 4 | 17.3 | 20.1 |
| Comparative Developer 2 | Comparative toner 2 | Comparative CCA 2 | 1.28 | 1.32 | 0.003 | 0.010 | 5 | 4 | 16.9 | 20.3 |
| Comparative Developer 3 | Comparative toner 3 | Comparative CCA 3 | 1.28 | 1.33 | 0.004 | 0.011 | 5 | 4 | 17.1 | 20.1 |

The results shown in chart 1 and chart 2 indicate that the toner in embodiments 1-4 containing the charge control agent formed by the azo chromium complex synthesized in the aqueous medium, used as the developer, provided excellent chargeability even in the low-temperature environment. The images were high-quality and displayed long-term stability.

The toner described in comparative examples 1-3 was also tested as a developer. In these examples, the azo chromium complex charge control agent is not synthesized in an aqueous medium but rather in an organic solvent. The electrification of the toner took a long time, and stable durable charges were not obtained. This method failed to yield stable images with high-quality pictures.

This invention is not to be limited to the specific embodiments disclosed herein, and modifications for various applications and other embodiments are intended to be included within the scope of the appended claims. While this invention has been described in connection with particular examples thereof, the true scope of the invention should not be so limited because other modifications will become apparent to the skilled practitioner upon study of the drawings, specification, and following claims.

The invention claimed is:

1. A method for producing charge control agent, the method comprising (a) mixing an azo compound with a salicylic acid chromium complex in an aqueous medium, and adding to said medium an inorganic base and a compound selected from the group consisting of a long-chain alkyl ammonium salt, an aryl ammonium salt, a crown ether and a strong polar solvent to form a mixture, wherein an amount of said long-chain alkyl ammonium salt, said aryl ammonium salt, or said crown ether is between 1 and 30 wt. % based on the amount of said salicylic acid chromium complex, and an amount of said strong polar solvent is between 0.5 and 30 wt. % based on the amount of said salicylic acid chromium complex; and (b) heating the obtained mixture in (a) to obtain an azo chromium complex indicated in formula (1), formula (1):

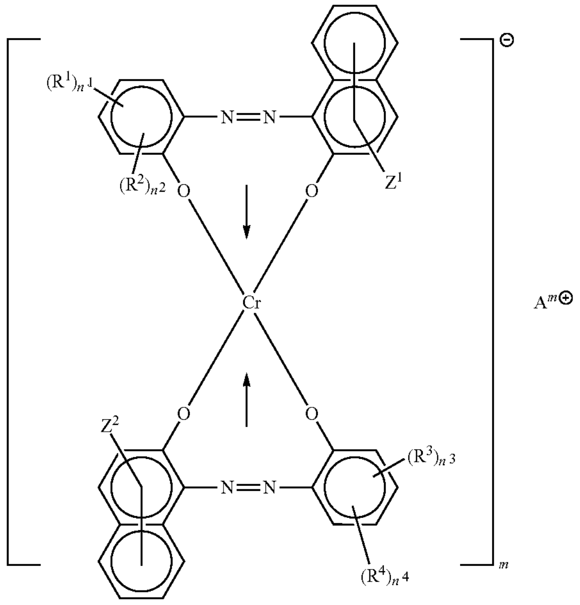

wherein, $R^1$ to $R^4$ are independently selected from the group consisting of hydrogen, substituted or unsubstituted alkyl having 1-18 carbon atoms, alkenyl with 1-18 carbon atoms, alkoxy with 1-18 carbon atoms, sulfonic acid group, methyl sulfonyl, sulfoacid amino, alkyl amino sulfonyl of the alkyl with 1-18 carbon atoms, hydroxyl, carboxyl, —$COOR^5$, in which, $R^5$ is alkyl with 1-18 carbon atoms, acetylamino, bromine, chlorine, iodine, fluorine and nitryl; $Z^1$ and $Z^2$ are independently selected from the group consisting of hydrogen, carboxyl, hydroxyl, —$COOR^6$, —$CONHR^7$, and —$NHCOR^8$, in which, $R^6$-$R^8$ are independently substituted or unsubstituted phenyl, substituted or unsubstituted alkyl having 1-18 carbon atoms, or substituted or unsubstituted cycloalkyl having 3-12 carbon atoms; additionally, $A^{m+}$ is a cation having an oxidation state of +1 to +6; m is an integer between 1 and 6, and $n^1$–$n^4$ are integers between 0 and 4 and are required to meet the condition of $n^1+n^2=4$ and $n^3+n^4=4$.

2. The method for producing charge control agent of claim 1, wherein the salicylic acid chromium complex which is used as the complexing agent is chromium salicylic acid alkali metal salt.

3. The method of claim 1, wherein said mixing an azo compound with a salicylic acid chromium complex in an aqueous medium comprises reacting an aromatic diazo compound with a naphthol compound in an aqueous medium to obtain a suspension of an azo compound, and adding a salicylic acid chromium complex into said suspension.

4. The method of claim 1 wherein said azo compound is a compound of formula (7), formula (7):

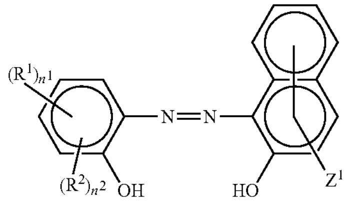

wherein, $R^1$ and $R^2$ are independently selected from the group consisting of hydrogen, substituted or unsubstituted alkyl having 1-18 carbon atoms, alkenyl with 2-18 carbon atoms, alkoxy group with 1-18 carbon atoms, sulfonic acid group, methyl sulfonyl group, sulfoacid amino group, alkyl amino sulfonyl with 1-18 carbon atoms, hydroxyl, carboxyl, $COOR^5$, in which, $R^5$ is alkyl group with 1-18 carbon atoms, acetylamino, bromine, chlorine, iodine, fluorine, and nitryl; $Z^1$ is selected from the group consisting of hydrogen, carboxyl, hydroxyl, $—COOR^6$, $—CONHR^7$, and $—NHCOR^8$, in which, $R^6$-$R^8$ are independently-substituted or unsubstituted phenyl, substituted or unsubstituted alkyl having 1-18 carbon atoms, or substituted or unsubstituted cycloalkyl having 3-12 carbon atoms; and $n^1$ and $n^2$ are integers between 0 and 4 and meet the conditions of $n^1+n^2=4$.

5. A method for producing charge control agent, the method comprising (a) mixing an azo compound of formula (7)

formula (7):

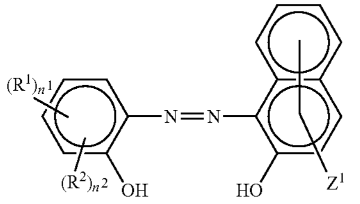

wherein in formula (7): $R^1$ and $R^2$ are independently selected from the group consisting of hydrogen, substituted or unsubstituted alkyl having 1-18 carbon atoms, alkenyl with 2-18 carbon atoms, alkoxy group with 1-18 carbon atoms, sulfonic acid group, methyl sulfonyl group, sulfoacid amino group, alkyl amino sulfonyl with 1-18 carbon atoms, hydroxyl, carboxyl, $—COOR^5$, in which, $R^5$ is alkyl group with 1-18 carbon atoms, acetylamino, bromine, chlorine, iodine, fluorine, and nitryl; $Z^1$ is selected from the group consisting of hydrogen, carboxyl, hydroxyl, $—COOR^6$, $—CONHR^7$, and $—NHCOR^8$, in which, $R^6$-$R^8$ are independently substituted or unsubstituted phenyl, substituted or unsubstituted alkyl having 1-18 carbon atoms, or substituted or unsubstituted cycloalkyl having 3-12 carbon atoms; and $n^1$ and $n^2$ are integers between 0 and 4 and meet the conditions of $n^1+n^2=4$; with a chromium salicylic acid alkali metal salt in an aqueous medium, and adding to said medium an inorganic base and a compound selected from the group consisting of a long-chain alkyl ammonium salt, an aryl ammonium salt, a crown ether and a strong polar solvent to form a mixture, wherein said inorganic base is sodium carbonate, sodium bicarbonate, ammonia, magnesium hydrate, cupric hydroxide, ferric hydroxide, potassium hydroxide, calvital, or caustic baryta, and an amount of said long-chain alkyl ammonium salt, said aryl ammonium salt, or said crown ether is between 1 and 30 wt. % based on the amount of said salicylic acid chromium complex, and an amount of said strong polar solvent is between 0.5 and 30 wt. % based on the amount of said salicylic acid chromium complex; and (b) heating the obtained mixture in (a) to obtain an azo chromium complex indicated in formula (1), formula (1):

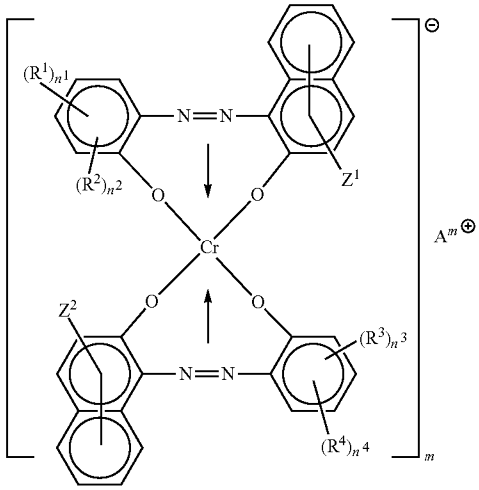

wherein in formula (1): $R^1$ to $R^4$ are independently selected from the group consisting of hydrogen, substituted or unsubstituted alkyl having 1-18 carbon atoms, alkenyl with 1-18 carbon atoms, alkoxy with 1-18 carbon atoms, sulfonic acid group, methyl sulfonyl, sulfoacid amino, alkyl amino sulfonyl of the alkyl with 1-18 carbon atoms, hydroxyl, carboxyl, and $—COOR^5$, in which, $R^5$ is alkyl with 1-18 carbon atoms, acetylamino, bromine, chlorine, iodine, fluorine and nitryl; $Z^1$ and $Z^2$ are independently selected from the group consisting of hydrogen, carboxyl, hydroxyl, $—COOR^6$, $—CONHR^7$, and $—NHCOR^8$, in which, $R^6$-$R^8$ are independently substituted or unsubstituted phenyl, substituted or unsubstituted alkyl having 1-18 carbon atoms, or substituted or unsubstituted cycloalkyl having 3-12 carbon atoms; additionally, $A^{m+}$ is a cation having an oxidation state of +1 to +6; m is an integer between 1 and 6, and $n^1$-$n^4$ are integers between 0 and 4 and are required to meet the condition of $n^1+n^2=4$ and $n^3+n^4=4$.

6. The method of claim 5, wherein said mixing an azo compound in formula (7) with a chromium salicylic acid alkali metal salt in an aqueous medium comprises reacting an aromatic diazo compound with a naphthol compound in an aqueous medium to obtain a suspension of an azo compound of formula (7), and adding a chromium salicylic acid alkali metal salt to said suspension.

7. A method for producing charge control agent, the method comprising:

(a) diazotizing a compound of formula (3) to obtain an aromatic diazo compound, and coupling the aromatic diazo compound with the compound of formula (5) in an aqueous medium to obtain an azo compound of formula (7), formula (3)

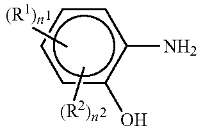

formula (5)

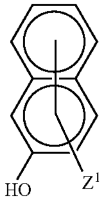

formula (7)

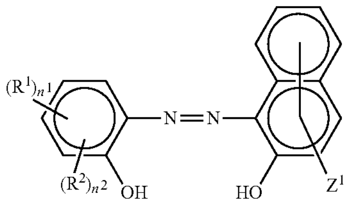

wherein $R^1$ and $R^2$ are independently selected from the group consisting of hydrogen, substituted or unsubstituted alkyl having 1-18 carbon atoms, alkenyl with 2-18 carbon atoms, alkoxy group with 1-18 carbon atoms, sulfonic acid group, methyl sulfonyl group, sulfoacid amino group, alkyl amino sulfonyl with 1-18 carbon atoms, hydroxyl, carboxyl, —$COOR^5$, in which, $R^5$ is alkyl group with 1-18 carbon atoms, acetylamino, bromine, chlorine, iodine, fluorine, and nitryl; $Z^1$ is selected from the group consisting of hydrogen, carboxyl, hydroxyl, —$COOR^6$, —$CONHR^7$, and —$NHCOR^8$, in which, $R^6$-$R^8$ are independently-substituted or unsubstituted phenyl, substituted or unsubstituted alkyl having 1-18 carbon atoms, or substituted or unsubstituted cycloalkyl having 3-12 carbon atoms; and $n^1$ and $n^2$ are integers between 0 and 4 and meet the conditions of $n^1+n^2=4$;

(b) adding a salicylic acid chromium complex, an inorganic base, and a compound selected from the group consisting of a long-chain alkyl ammonium salt, an aryl ammonium salt, a crown ether and a strong polar solvent to said aqueous medium to form a mixture, wherein said inorganic base is sodium carbonate, sodium bicarbonate, ammonia, magnesium hydrate, cupric hydroxide, ferric hydroxide, potassium hydroxide, calvital, or caustic baryta, and an amount of said long-chain alkyl ammonium salt, said aryl ammonium salt, or said crown ether is between 1 and 30 wt. % based on the amount of said salicylic acid chromium complex, and an amount of said strong polar solvent is between 0.5 and 30 wt. % based on the amount of said salicylic acid chromium complex; and (c) heating the obtained mixture in (a) to obtain an azo chromium complex of formula (1), formula (1):

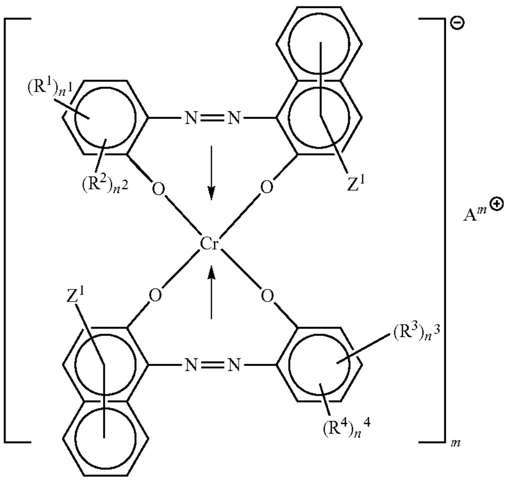

wherein in formula (1): $R^1$ to $R^4$ are independently selected from the group consisting of hydrogen, substituted or unsubstituted alkyl having 1-18 carbon atoms, alkenyl with 1-18 carbon atoms, alkoxy with 1-18 carbon atoms, sulfonic acid group, methyl sulfonyl, sulfoacid amino, alkyl amino sulfonyl of the alkyl with 1-18 carbon atoms, hydroxyl, carboxyl, and —$COOR^5$, in which, $R^5$ is alkyl with 1-18 carbon atoms, acetylamino, bromine, chlorine, iodine, fluorine and nitryl; $Z^1$ and $Z^2$ are independently selected from the group consisting of hydrogen, carboxyl, hydroxyl, —$COOR^6$, —$CONHR^7$, and —$NHCOR^8$, in which, $R^6$-$R^8$ are independently substituted or unsubstituted phenyl, substituted or unsubstituted alkyl having 1-18 carbon atoms, or substituted or unsubstituted cycloalkyl having 3-12 carbon atoms; additionally, $A^{m+}$ is a cation having an oxidation state of +1 to +6; m is an integer between 1 and 6, and $n^1$–$n^4$ are integers between 0 and 4 and are required to meet the condition of $n^1+n^2=4$ and $n^3+n^4=4$.

8. The method of claim 1, wherein said inorganic base is sodium carbonate, sodium bicarbonate, ammonia, magnesium hydrate, cupric hydroxide, ferric hydroxide, potassium hydroxide, calvital, or caustic baryta.

9. The method of claim 1, wherein said strong polar solvent is N,N-dimethylformamide, N,N-dimethyl propanamide, N-methyl-2-pyrrolidinone, dimethylimidazolidine, dimethyl sulfoxide, tetrahydrofuran, γ-butyrolactone, or diacetone alcohol.

10. The method of claim 1, wherein in (a), said inorganic base and a compound selected from the group consisting of a long-chain alkyl ammonium salt, an aryl ammonium salt, and a crown ether are added to said aqueous medium.

11. The method of claim 1, wherein in (a), sodium carbonate and benzyl triethyl ammonium chloride are added to said aqueous medium.

12. The method of claim 1, wherein in (a), sodium carbonate and N,N-dimethylformamide are added to said aqueous medium.

13. The method of claim 5, wherein said strong polar solvent is N,N-dimethylformamide, N,N-dimethyl propanamide, N-methyl-2-pyrrolidinone, dimethylimidazolidine, dimethyl sulfoxide, tetrahydrofuran, γ-butyrolactone, or diacetone alcohol.

14. The method of claim 5, wherein in (a), said inorganic base and a compound selected from the group consisting of a long-chain alkyl ammonium salt, an aryl ammonium salt, and a crown ether are added to said aqueous medium.

15. The method of claim 5, wherein in (a), sodium carbonate and benzyl triethyl ammonium chloride are added to said aqueous medium.

16. The method of claim 5, wherein in (a), sodium carbonate and N,N-dimethylformamide are added to said aqueous medium.

17. The method of claim 7, wherein said strong polar solvent is N,N-dimethylformamide, N,N-dimethyl propanamide, N-methyl-2-pyrrolidinone, dimethylimidazolidine, dimethyl sulfoxide, tetrahydrofuran, γ-butyrolactone, or diacetone alcohol.

18. The method of claim 5, wherein in (a), said inorganic base and a compound selected from the group consisting of a long-chain alkyl ammonium salt, an aryl ammonium salt, and a crown ether are added to said aqueous medium.

19. The method of claim 7, wherein sodium carbonate and benzyl triethyl ammonium chloride are added to said aqueous medium of (b).

20. The method of claim 7, wherein sodium carbonate and N,N-dimethylformamide are added to said aqueous medium of (b).

* * * * *